US006725975B2

(12) United States Patent
Chapman

(10) Patent No.: US 6,725,975 B2
(45) Date of Patent: Apr. 27, 2004

(54) POSITIONING ROTARY ACTUATORS

(75) Inventor: Roger C. Chapman, Farnham (GB)

(73) Assignee: Kinetrol Limited, Farnham (GB)

( * ) Notice: Subject to any disclaimer, the term of this patent is extended or adjusted under 35 U.S.C. 154(b) by 0 days.

(21) Appl. No.: 09/933,869

(22) Filed: Aug. 22, 2001

(65) Prior Publication Data

US 2003/0026034 A1 Feb. 6, 2003

(30) Foreign Application Priority Data

Aug. 22, 2000 (GB) ............................................ 0020692

(51) Int. Cl.[7] .................................................. F03G 1/00

(52) U.S. Cl. ...................... 185/37; 185/45; 251/129.12; 92/130 B; 92/130 C

(58) Field of Search ................................ 267/150, 177, 267/167, 171, 156, 154; 251/129.12; 92/130 B, 130 C, 132; 192/139, 148; 185/37, 45, 40 R

(56) References Cited

U.S. PATENT DOCUMENTS 3,122,351 A * 2/1964 Brown ........................ 251/73
3,279,744 A * 10/1966 Fieldsen et al. ....... 251/129.03
3,885,325 A 5/1975 Sidoti
3,889,924 A * 6/1975 Karpenko ................ 251/249.5
4,130,182 A * 12/1978 Aunspach .................... 185/45
4,333,391 A * 6/1982 Nash ........................... 92/121
4,381,437 A 4/1983 Geremia
4,639,021 A * 1/1987 Hope ............................ 292/7
5,007,330 A 4/1991 Scobie et al.
5,046,575 A * 9/1991 Asayama .................... 180/178
5,054,374 A 10/1991 Scobie et al.
5,310,021 A * 5/1994 Hightower ................ 185/40 R
5,386,761 A * 2/1995 Holtgraver ................... 92/120
6,281,453 B1 * 8/2001 Uleski ........................... 200/4
6,318,701 B1 * 11/2001 Gardner ....................... 251/59

FOREIGN PATENT DOCUMENTS

GB 1 270 941 4/1972
JP 2-11902 1/1990

* cited by examiner

*Primary Examiner*—Jack Lavinder
*Assistant Examiner*—Mariano Sy
(74) *Attorney, Agent, or Firm*—Larson & Taylor PLC

(57) ABSTRACT

In order to position a rotary actuator, a positioning device is coupled to the actuator. The positioning device has a coupling shaft and springs which respectively surround top and bottom portions of the shaft and are coupled thereto by respective coupling rings. The springs apply oppositely directed torques to the shaft such that one spring urges the shaft in a clockwise direction towards a stop position and the other spring urges the shaft in a anticlockwise direction towards that stop position. The stop position corresponds to an intermediate rotary position of the actuator.

6 Claims, 3 Drawing Sheets

POSITIONING ROTARY ACTUATORS

BACKGROUND OF THE INVENTION

1. Field of the Invention

The present invention relates to a device for positioning a rotary actuator.

2. Summary of the Prior Art

Many forms of rotary actuator have only two stable positions, corresponding to the opposite ends of the rotary stroke of the actuator. For example, in a known form of pneumatic rotary actuator, compressed air is supplied to one side or the other of a pivoting vane sealed within a housing, to switch the vane between two end stops limiting its travel. Such an arrangement provides an extremely reliable manner of actuating for mechanisms that have only two operating positions, such as a two port valve.

However, there are many mechanisms that rotary actuators can be usefully used to control, but which have three or more operating positions. For instance, three port valves might require three stop positions and two port valves are sometimes used to crudely control flow rate by introducing an intermediate stop position. Accordingly, it is known to control a rotary actuator to stop at a position intermediate its two end positions. In the known pneumatic actuator referred to above this is achieved, for example, by using solenoid valves to control the flow of air to either side of the vane to position and then hold the vane in an intermediate position by balancing the air pressure on opposite sides of the vane.

Such position control mechanisms are, however, rather complex and do not always provide reliable positioning of the actuator.

SUMMARY OF THE INVENTION

It is a general aim of the present invention to provide a more reliable device for accurately and consistently positioning a rotary actuator at an intermediate position in its stroke.

Accordingly, there is proposed a device for positioning a rotary actuator, the device comprising a rotatably mounted coupling shaft, one end of which can be coupled to an output of the rotary actuator, and a pair of resilient biassing means for applying oppositely directed torques to the coupling shaft, one of the biassing means urging the shaft in a clockwise direction towards a stop position and the other urging the shaft in an anticlockwise direction towards said stop position.

The positioning device can be coupled to the actuator with the stop position, to which the coupling shaft of the device is urged by both biassing means, aligned with the desired intermediate rotary position of the actuator. In this way, when no other operating force is applied to the actuator, the biassing means act to return the actuator to its intermediate position.

In order to provide a more positive stop position for the coupling shaft, the biassing means preferably act on the shaft through a coupling assembly arranged so that the biassing means urging the coupling shaft in a clockwise direction towards said stop position is uncoupled from the shaft when the shaft rotates in a clockwise direction beyond the stop position and the biassing means urging the coupling shaft in an anticlockwise direction towards said stop position is uncoupled from the shaft when the shaft rotates in an anticlockwise direction beyond the stop position. With this arrangement, even if the biassing means are not balanced with one another, the stop position is accurately defined.

In a particularly preferred form the coupling assembly comprises a pair of coupling members, each of the biassing means acting on the coupling shaft through a respective one of the coupling members. Each coupling member is prevented by a physical stop from rotating beyond the stop position in the direction of the bias, but the coupling shaft is free to continue rotating in this direction independently of the coupling member. In this way, since the biassing means acts on the coupling member, rather than directly on the coupling shaft, once the shaft rotates beyond the stop position, the biassing means ceases to act on it.

The biassing means preferably apply substantially only a torque to the coupling shaft. That is to say, preferably little or no lateral forces are applied to this shaft. Clock-type springs are particularly suitable, since they provide substantially a pure torque output.

BRIEF DESCRIPTION OF THE DRAWINGS

Embodiments of the invention are described below, by way of example, with reference to the accompanying drawings in which.

DETAILED DESCRIPTION

Figure 1:
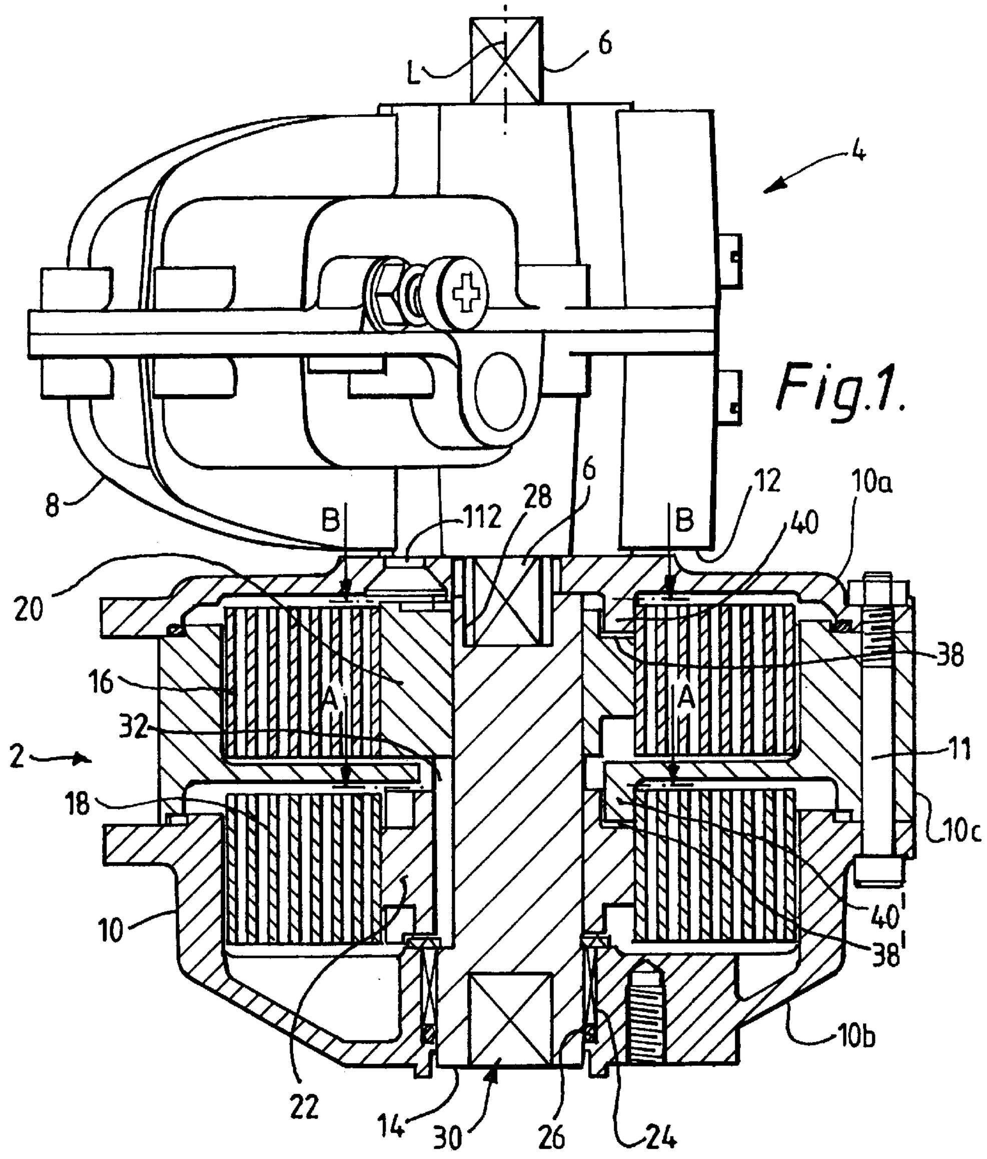
FIG. 1 is a sectioned view of a positioning device according to a first embodiment of the invention, shown coupled to a rotary actuator, the section being taken along line C—C of FIG. 3.

Referring initially to FIG. 1, the positioning device 2 of a first embodiment of the invention is shown coupled to a rotary actuator 4, which in this example is a pneumatic actuator. The device 2 is not, however, limited to use with actuators of the type shown, and may be used in conjunction with other types of rotary actuator, including hydraulically and electrically operated actuators.

It is not important to discuss the detailed construction of the actuator 4 here, but it is useful to note that rotary motion of the actuator is about a vertical axis (L) as it appears in FIG. 1, the rotary output from the actuator being taken from two, square section stub shafts 6 seen protruding from the top and bottom of the actuator casing 8 (as is conventional). The positioning device 2 is coupled to the lower one of these outputs 6.

Looking now at the positioning device 2 itself, shown in section in FIG. 1, a housing 10 of the device is formed in this example in three parts. An upper, base plate part **10*a* of the housing forms its top wall, and is fixed to a mounting face 12 of the actuator by fasteners 112. The bottom wall of the housing 10 is provide by a cup-shape lower housing part 10*b*, and the housing is completed by a generally annular shape intermediate housing part 10*c*. The three housing components are secured together by bolts 11 which pass through the lower, intermediate and upper housing part 10*b*,10*c*,10*a*** in turn.

The housing 10 supports and retains the main operating components of the device, namely a central, rotatably mounted coupling shaft 14, a pair of clock-type springs 16,18 which respectively surround top and bottom portions 14*a*,14*b* of the shaft 14, and a pair of coupling rings 20,22 which also surround the shaft 14, a respective one of these rings 20,22 being interposed between each spring 16,18 and the shaft 14. In use, torque can be applied to the shaft 12 by the springs 16,18 through their respective coupling rings 20,22, the uppermost spring 16 as seen in FIG. 1 being mounted to bias rotation of the shaft 14 in an anticlockwise direction (when viewed from above) and the lower of the two springs 18 biassing the shaft 14 in a clockwise direction.

The coupling shaft 14 is mounted for rotation at its lower end in a bearing 24 supported on the lower housing part 10*b*. A shaft seal 26 seals the shaft 14 within the housing at this point also. The upper end of this shaft 14 is coupled to the stub shaft output 6 of the rotary actuator, the square section stub shaft 6 being engaged in a recess 28 of the same section formed in the top end face of the shaft 14, so that the shaft 14 rotates with the actuator output 6. The lower end of the shaft 14 is formed with a similar square section recess 30, allowing an output from the actuator to be taken off here.

Figure 3:
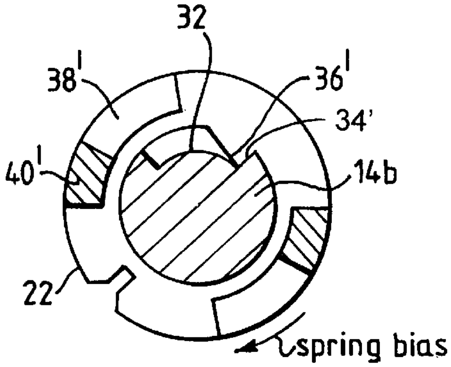
FIG. 3 is a cross-section on line A—A in FIG. 1.
Figure 2:
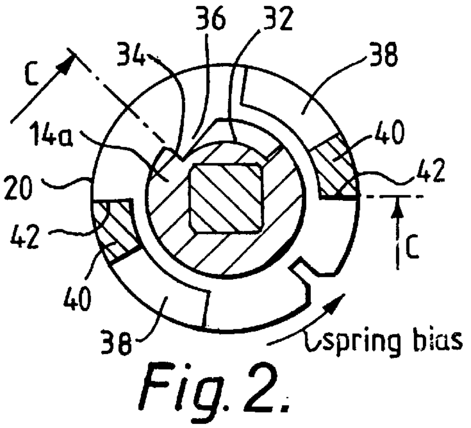
FIG. 2 is a cross-section on line B—B in FIG. 1.

With reference to FIGS. 2 and 3, the manner in which the springs 16,18 (not shown in these figures) are coupled to the upper and lower portions 14*a*,14*b* of the shaft through the coupling rings 20,22 will be explained. Looking first at FIG. 2, which illustrates the upper coupling ring 20 and its coupling with the upper portion 14*a* of the shaft, it can be seen that the circumferential surface of the shaft 14 is recessed to form a channel 32 running the length of the shaft 14. In this example, the channel 32 extends around an approximately 90 degree segment of the shaft's circumference, The left most (as seen in FIG. 2) axially extending side wall of this channel 32 forms a shoulder 34 against which a radially inwardly protruding detent portion 36 of the coupling ring 20 can abut. Thus, if the shaft 14 is rotated in a clockwise direction from the position illustrated in FIG. 2, the coupling ring 20 rotates with it, against the bias of the spring 16 which, as mentioned above, urges the ring 20 in an anticlockwise direction.

In this example, the outside circumferential profile of the coupling ring 20 is formed with a pair of diametrically opposed recessed regions 38. Each of these regions extends around an approximately 90 degree segment of the ring 20 and runs about one third the axial length of the ring 20, opening to its top face as seen in FIG. 1. These recesses 38 are engaged by stops 40 which, as seen most clearly in FIG. 1 (where only one stop can be seen), are formed integrally with the upper part 10*a* of the housing. In the position illustrated in FIG. 2, it can be seen that these stops butt against respective shoulders 42 formed by one circumferential end of the recesses 38, preventing rotation of the coupling ring 20 in an anticlockwise direction beyond the position seen in FIG. 2. This position can be referred to as a stop position of the positioning device 2. The shaft 14, however, is not prevented by this coupling from further anticlockwise rotation from the illustrated position. Moreover, as the shaft 14 is rotated anticlockwise from the stop position the shoulder 34 of the shaft 14 moves away from the detent portion 36 of the coupling ring 20. Since the spring bias acts through the coupling ring, this has the effect of uncoupling the spring 16 from the shaft 14.

Whilst diametrically opposed recesses/stops are described here, any arrangement of one or more recesses/stops, or alternative stop means may be employed to achieve the desired function. The axial extend of the recesses and stops is also not necessarily as illustrated, although the axial extent is preferably not too small otherwise problems of excessive wear may occur.

Furthermore, although not illustrated here, it is possible to provide for mechanical (or other) adjustment of the stop positions, for example by allowing for angular adjustment between the spring assembly and the actuator it positions and/or by adjusting the actuator end stops.

FIG. 3 illustrates the lower coupling ring 22 and the lower portion 14*b* of the shaft 14, with which it is coupled. As will be apparent, in the same manner as described above for the upper coupling ring 20, a detent portion 36' of the coupling ring 22 engages a shoulder 34' of the channel 32, and stops 40' formed integrally with the intermediate housing part 10*c* engage recessed portions 38' in the outer circumferential face of the coupling ring 22. However, the orientation of these features is reversed, so that the stops 40' prevent clockwise rotation of the ring 22 from the illustrated stop position and the anticlockwise rotation of the shaft 14 from the stop position rotates the coupling ring 22 against the bias of the lower spring 18, which applies a clockwise directed torque to the ring 22.

In use, the positioning device 2 is coupled to the output 6 of the rotary actuator with the stop position of the device 2 corresponding to the desired intermediate position of the actuator. For example, in the case of the illustrated, the positioning device 2 is coupled to the pneumatic actuator 4 so that when the device is in its stop position the vane of the actuator is held midway between the two end points of its rotary stroke. Of course, the intermediate position of the actuator need not be midway along the stroke, but can be set at any desired point by appropriate configuration of the coupling between the actuator 4 and the positioning device 2.

Referring again to FIGS. 2 and 3, the operation of the actuator/positioning device assembly will be described. As already noted, the position of the device 2 illustrated in the figures is the stop position described above. In this position, with no operating force applied to the actuator, the bias of the two springs 16,18 holds the two coupling rings 20,22 against their respective stops 40,40', the rings in turn holding the shaft 14, and hence the output 6 of the actuator stationary at an intermediate position, in this example midway, along the rotary stroke of the actuator 4.

If the actuator is then operated to be displaced clockwise (as viewed from above in FIG. 1) towards one of its end positions (e.g. by supplying compressed air to one side of the vane in the case of the pneumatic actuator described above), the shaft 14 is rotated through its coupling with the actuator output 6 in a clockwise direction. This in turn rotates the upper coupling ring 20 in a clockwise direction against the bias of the upper spring 16. The lower coupling ring 22, however, remains stationary, the stops 40' preventing any clockwise movement from the illustrated stop position. The shoulder 34' of the channel 32 moves away from the detent portion 36' of the lower ring 22, effectively disengaging the lower spring 18 from the shaft 14. When the air pressure (or other operating force) is subsequently removed, the upper spring 16 returns the upper coupling ring 20, and hence the shaft 14 and actuator 4, once again to the position illustrated in FIGS. 2 and 3.

In a similar way, when an anticlockwise operating force is applied to the actuator 4 (e.g. by supplying compressed air to the opposite side of the vane in the case of the pneumatic actuator illustrated), the actuator output 6 and consequently the shaft 14 are rotated anticlockwise. This time, it is the lower coupling ring 22 that is rotated against the bias of its associated spring 18, the upper spring 16 being disengaged from the shaft 14 as the shoulder 34 moves away from the detent portion 36 of the upper coupling ring 20. Once the operating force is removed, the lower spring 18 returns the mechanism once again to its intermediate stop position.

As will be appreciated, the mechanism described above provides a very simple mechanical, and thus extremely reliable mechanism for positioning and holding an actuator at a position intermediate its two natural end positions. This is particularly so in form of the invention specifically described above, due to the inherent reliability of clock spring-type mechanisms. The use of stops in the manner described above also results in very accurate and repeatable positioning of the actuator since, so long as the required output torque is within the capacity of the springs (with the air off) or within the capacity of the resultant of actuator torque and spring torque when the air is on, this intermediate position is not affected by the load on the actuator.

A further significant advantage over earlier positioning devices is that by virtue of the use of two opposed biasses, the mechanism has an inherent 'fail safe' position, the intermediate position, to which it will return the actuator should there be a loss of air pressure for example (or hydraulic pressure or electrical signal in the cases of hydraulic or electric actuators). This, in combination with the fact that the device avoids the need for e.g. solenoid or other electrical switches, means that the device is appropriate for use in hazardous environments.

Use of the present system also avoids the need for the more complex pneumatic or electro-pneumatic systems that have been used previously to achieve mid-travel stop positions. Again, such systems have typically not been suitable for hazardous environments and are often limited to working in environments in which the temperature does not exceed 80–100° C.

Figure 4:
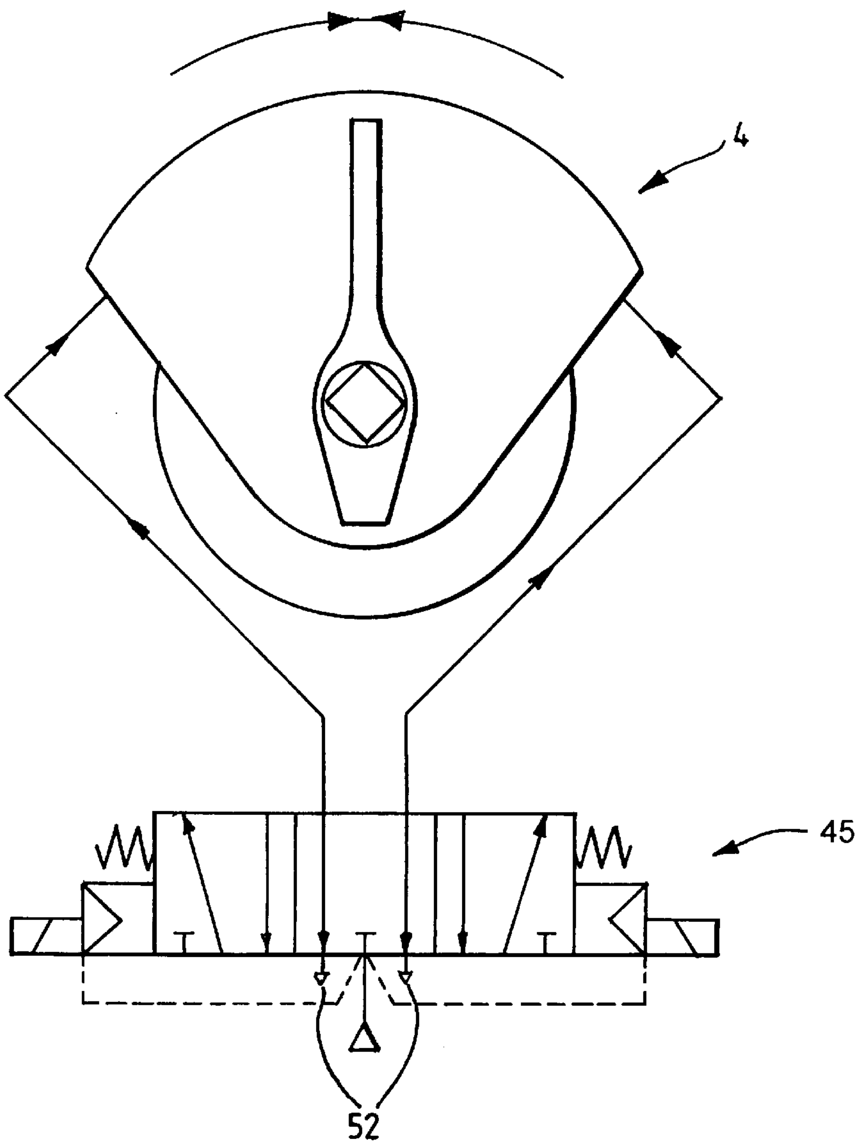
FIG. 4 is a schematic diagram of a pneumatic circuit suitable for controlling a rotary actuator coupled to the positioning device of FIG. 1.

For instance, FIG. 4 illustrates a suitable pneumatic circuit that can be used to control the position of the rotary actuator 4 seen in FIG. 1. A 5 port/3 way double solenoid 45 valve is employed. This valve is spring biased to the central position, so that it returns to that position when the electrical signal and/or air supply is removed. In this central position of the valve, air from both sides of the actuator 4 is free to pass out of exhaust ports 52 in the valve 45, to allow the actuator to be moved to its central stop position under the influence of the positioning device 2.

Figure 5:
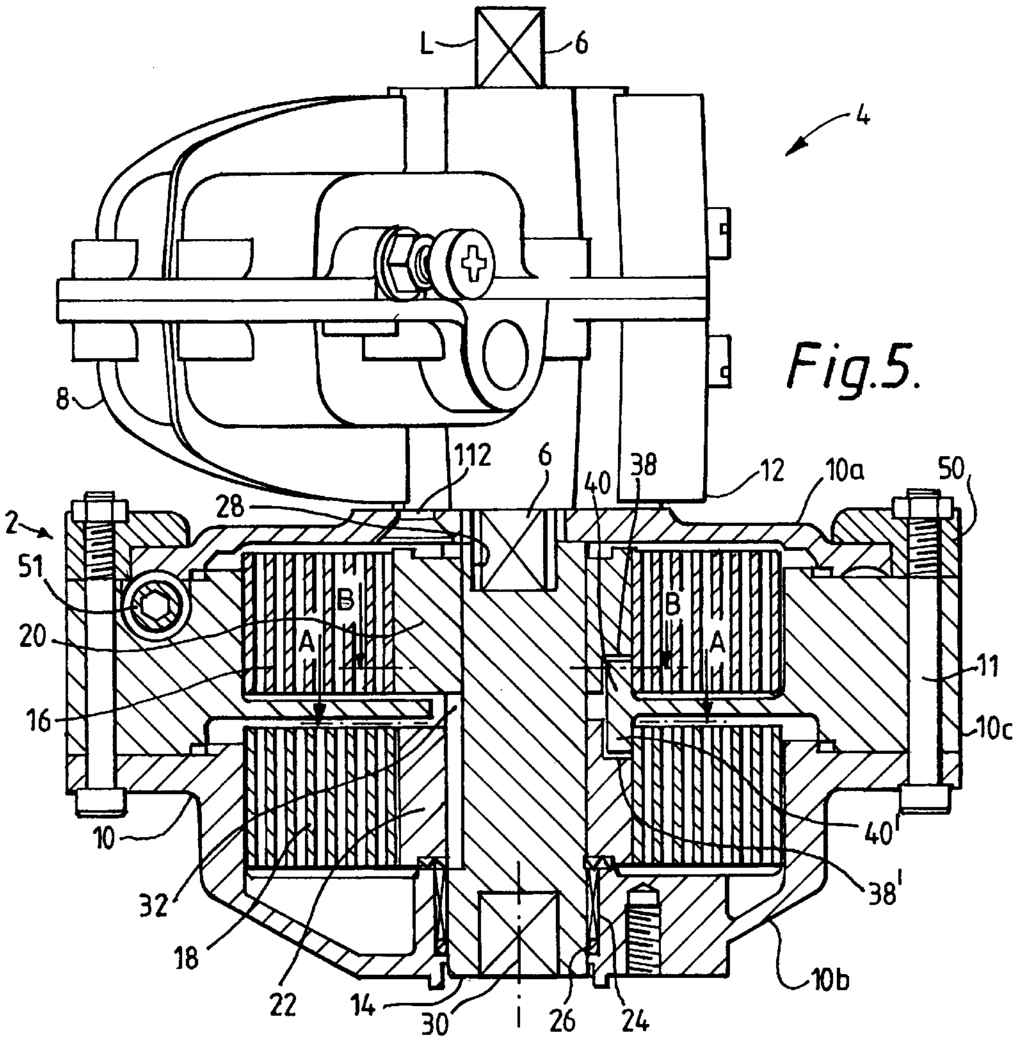
FIG. 5 is a sectioned view of a positioning device according to a second embodiment of the invention, shown coupled to a rotary actuator, the section being taken along the line C'—C' in FIG. 7.
Figure 6:
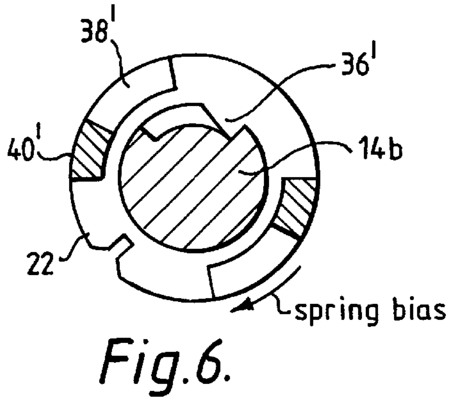
FIG. 6 is a cross section on line A'—A' in FIG. 5.
Figure 7:
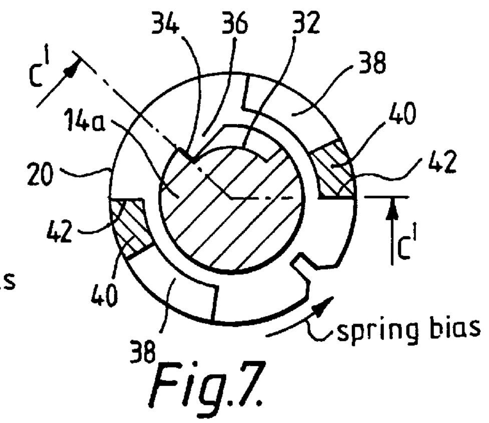
FIG. 7 is a cross section on line B'—B' in FIG. 5.

A second embodiment of the invention will now be described with reference to FIGS. 5 to 7. In most respects, this second embodiment is the same as the first embodiment and the same reference numerals are used to indicate corresponding parts.

The second embodiment differs from the first in the position of the stops 40. In the first embodiment shown in FIG. 1, those stops are formed integrally with the upper part 10*a* of the housing. In the second embodiment, however, they are integral with the intermediate housing part 10*c*, in similar way to the stops 40'. Note that only one stop 40 is shown in FIG. 5, but the two stops 40 can be seen in FIG. 7. The operation of the stops 40 (and also the stops 40') is the same as in the first embodiment and therefore will not be described in further detail now.

The second embodiment also differs from the first in that the central stop position is adjustable relative to the two end stops. In the first embodiment, the upper part 10*a* of the housing is fixed to the lower part 10*b* and intermediate part 10*c* by bolts 11. In the second embodiment, however, bolts 11 fix the intermediate housing part 10*c* and lower housing part 10*b* to a clamp plate 50, which clamps the upper housing part 10*a* onward onto the intermediate housing part 10*c*. In addition there is a worm drive 51 formed by a worm gear in the intermediate housing parts 10*c* which meshes with corresponding teeth in the upper housing part 10*a*. By rotating the worm gear of the worm drive 51, e.g. by an allen key, the upper housing part 10*a* can be rotated relative to the intermediate housing part 10*c*. Since the stops 40 and 40' are integral with the intermediate housing part 10*c*, whilst the actuator 4 is mounted on the upper housing part 10*a*, the effect of such rotation is to move the "central" stop position between the end positions of the rotary actuator.

No doubt, in this embodiment, the clamp plate 50 does not restrict rotational movement of the upper housing part 10*a* relative to the intermediate housing part 10*c*, but prevents axial movement. Rotation is controlled by the worm drive 51. When the worm of that worm drive 51 is stationary, the corresponding teeth on the upper housing part 10*a* prevent rotation of the upper housing part 10*a* relative to the intermediate housing part 10*c*. However, there is also clamping of the upper housing part 10*a* to the intermediate housing part 10*c* by the clamp plate 50 and screws 11, which clamping is released during adjustment.

What is claimed is:

1. A rotary actuator assembly comprising:

a rotary actuator; and a device for positioning the rotary actuator, the device being coupled to the actuator and comprising a rotatably mounted coupling shaft, one end of said shaft being coupled to an output of the rotary actuator, and first and second resilient biasing means for respectively applying oppositely directed torques to the coupling shaft, said first biasing means urging the shaft in a clockwise direction towards a stop position and said second biasing means urging the shaft in an anticlockwise direction towards said stop position and being discrete from said first resilient biasing means; and wherein the biasing means act on the shaft through a coupling assembly arranged so that the first biasing means urging the coupling shaft in a clockwise direction towards said stop position is uncoupled from the shaft when the shaft rotates in a clockwise direction beyond the stop position and the second biasing means urging the coupling shaft in an anticlockwise direction towards said stop position is uncoupled from the shaft when the shaft rotates in an anticlockwise direction beyond the stop position.

2. An assembly according to claim 1, wherein the device is coupled to the actuator such that said stop position is aligned with a desired intermediate rotary position of the actuator.

3. An assembly according to claim 1, wherein the coupling assembly comprises first and second coupling members, the first and second biasing means acting on the coupling shaft respectively through the first and second coupling members.

4. An assembly according to claim 3 having a physical stop for preventing each coupling member from rotating beyond the stop position in the direction of the bias, but the coupling shaft is free to continue rotating in this direction independently of the coupling member.

5. An assembly according to claim 1, wherein said stop position is adjustable.

6. A device for positioning a rotary actuator, comprising a rotatably mounted coupling shaft, said shaft having one end of which can be coupled to an output of the rotary actuator, and first and second resilient biasing means for respectively applying oppositely directed torques to the coupling shaft, said first biasing means urging the shaft in a clockwise direction towards a stop position and said second biasing means urging the shaft in an anticlockwise direction towards said stop position and being discrete from said first resilient biasing means, wherein the biasing means act on the shaft through a coupling assembly arranged so that the first biasing means urging the coupling shaft in a clockwise direction towards said stop position is uncoupled from the shaft when the shaft rotates in a clockwise direction beyond the stop position and the second biasing means urging the coupling shaft in an anticlockwise direction towards said stop position is uncoupled from the shaft when the shaft rotates in an anticlockwise direction beyond the stop position.

* * * * *